No. 734,526. PATENTED JULY 28, 1903.
G. H. ENNIS.
ELECTRIC TYPE WRITER.
APPLICATION FILED SEPT. 16, 1901.
NO MODEL. 7 SHEETS—SHEET 1.
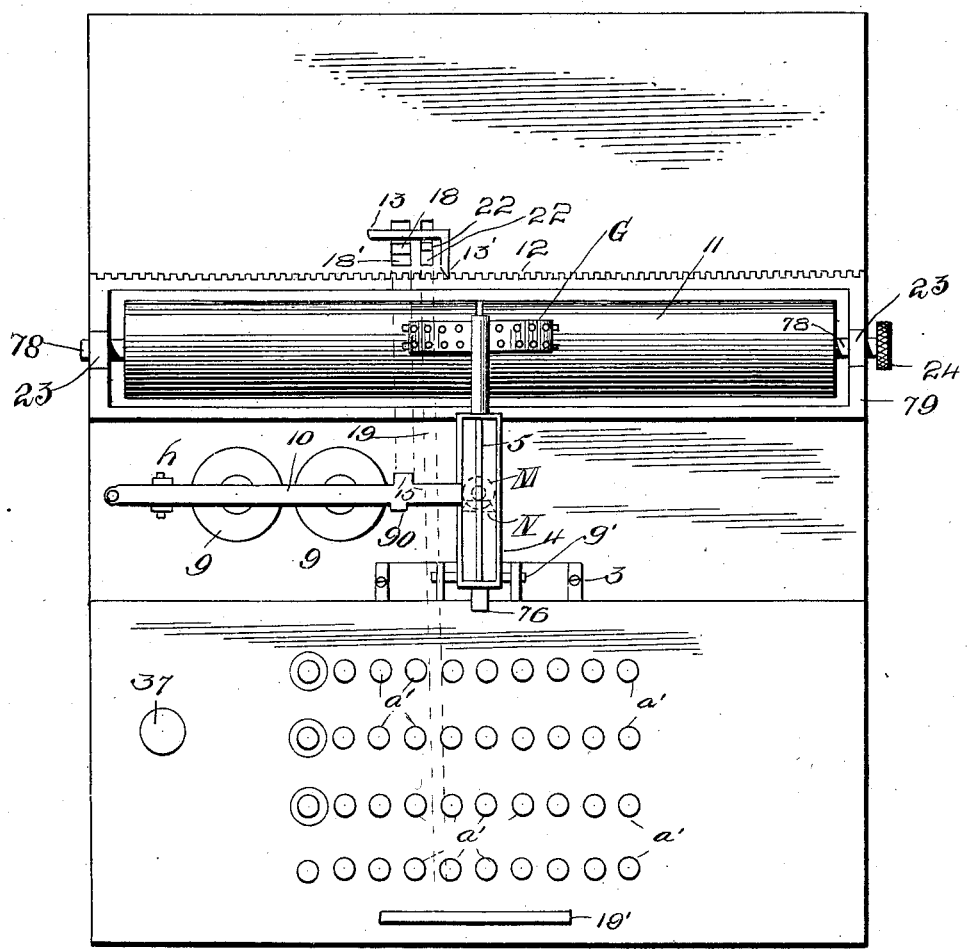

No. 734,526. PATENTED JULY 28, 1903.
G. H. ENNIS.
ELECTRIC TYPE WRITER.
APPLICATION FILED SEPT. 16, 1901.
NO MODEL. 7 SHEETS—SHEET 2.
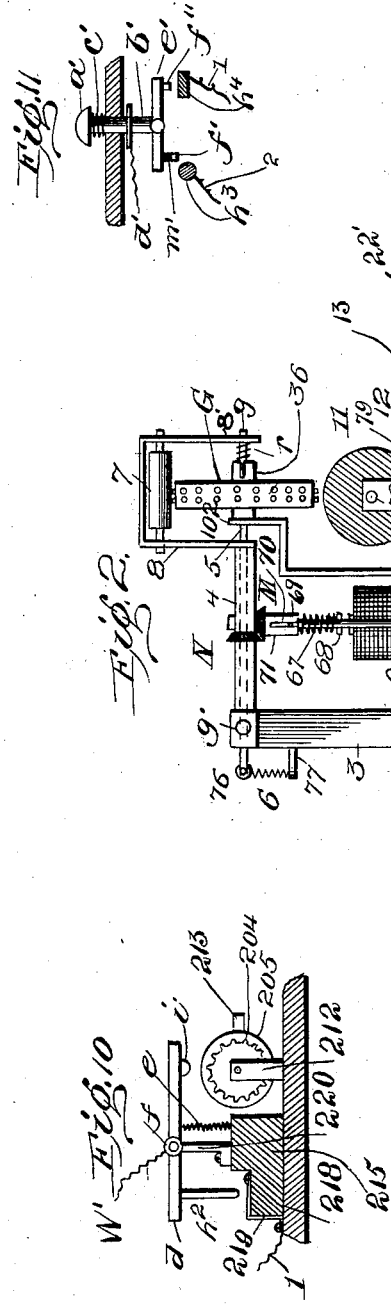
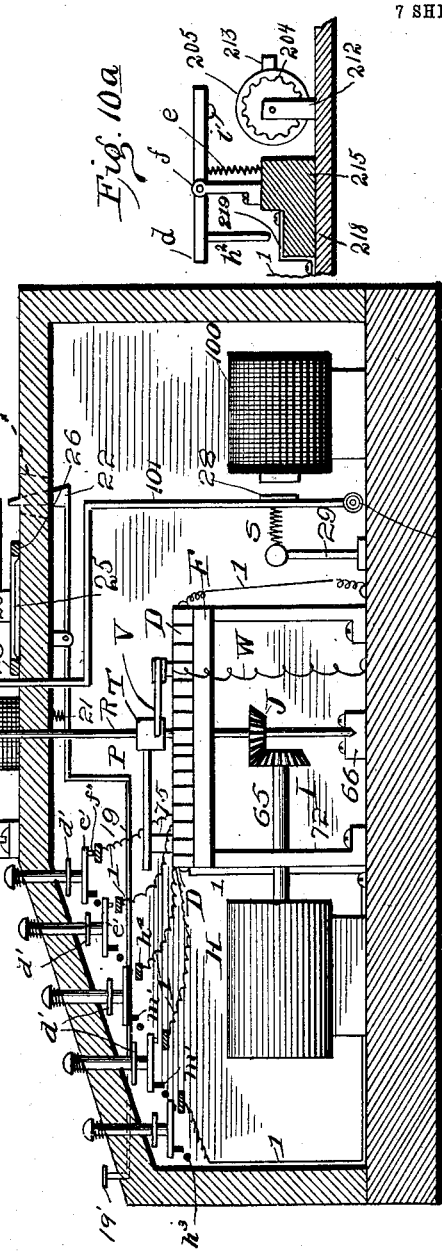
Witnesses:
J. M. Fowler Jr.
Watts T. Estabrook
Inventor
George H. Ennis
By Vernon E. Hodge Atty.

No. 734,526. PATENTED JULY 28, 1903.
G. H. ENNIS.
ELECTRIC TYPE WRITER.
APPLICATION FILED SEPT. 16, 1901.
NO MODEL. 7 SHEETS—SHEET 3.
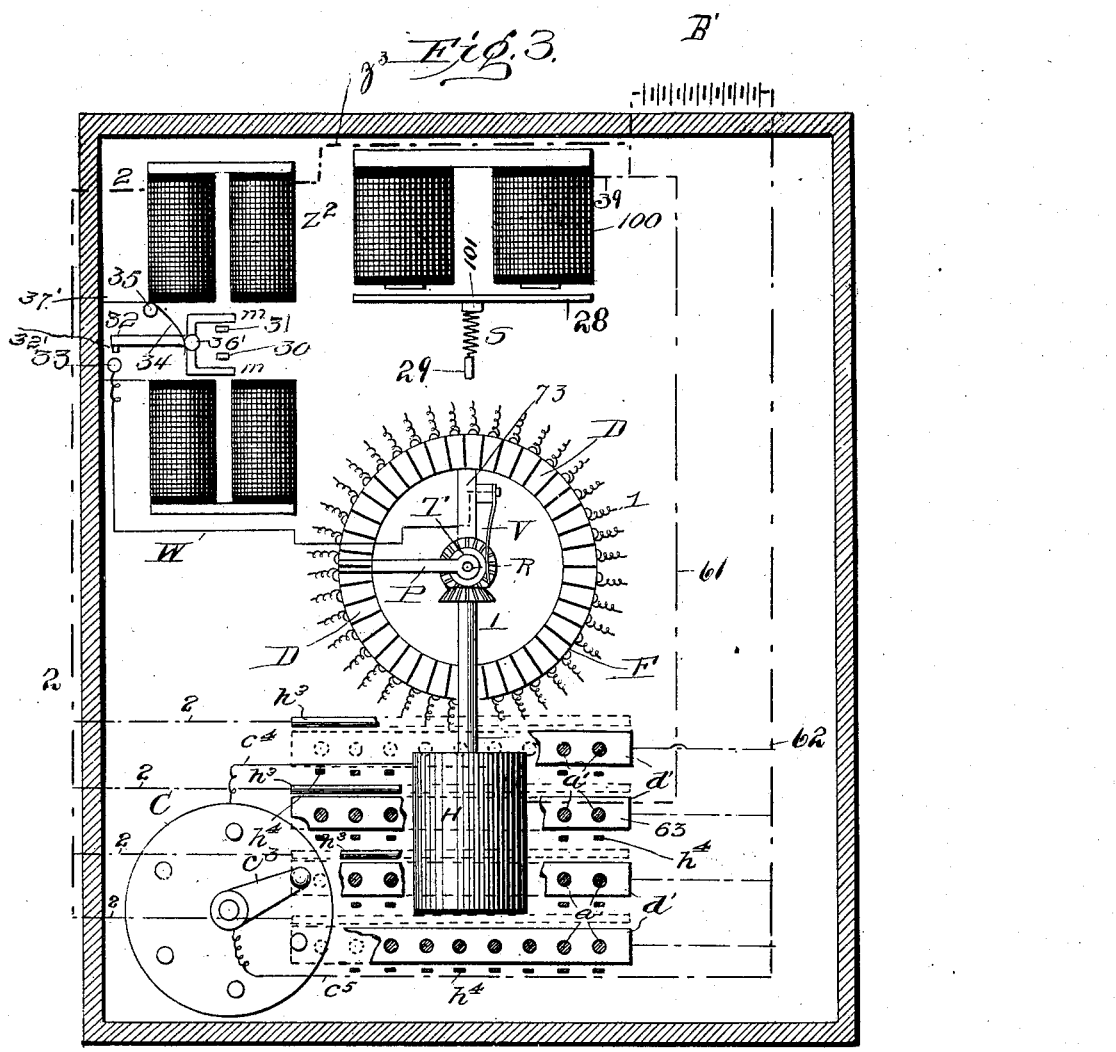
Witnesses:
J. M. Fowler Jr.
Watts T. Estabrook
Inventor
George H. Ennis
By Vernon E. Hodges
Atty No. 734,526. PATENTED JULY 28, 1903.
G. H. ENNIS.
ELECTRIC TYPE WRITER.
APPLICATION FILED SEPT. 16, 1901.
NO MODEL. 7 SHEETS—SHEET 4.
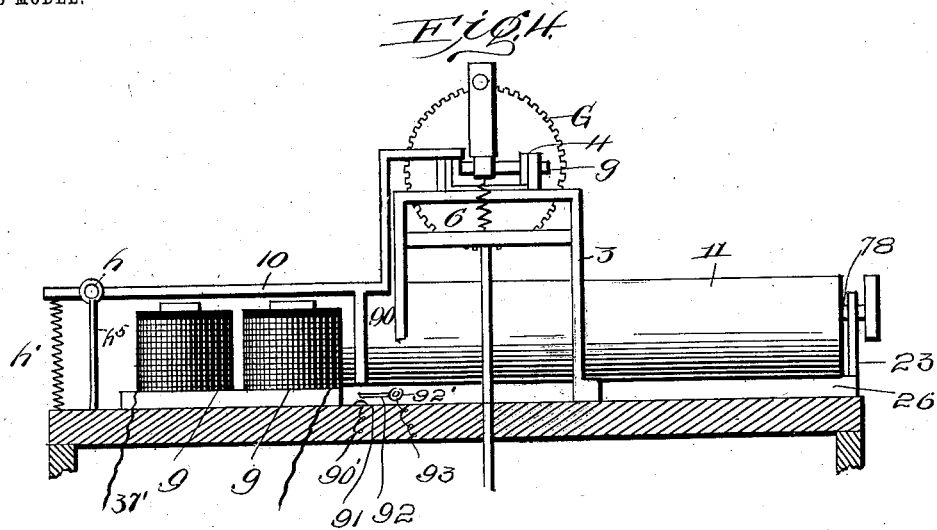
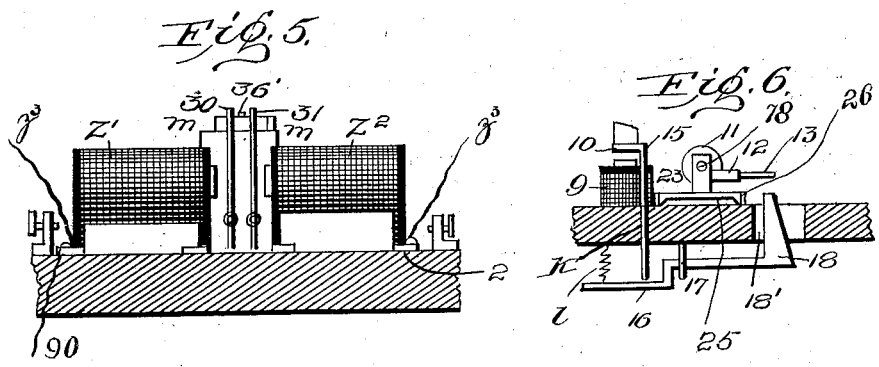
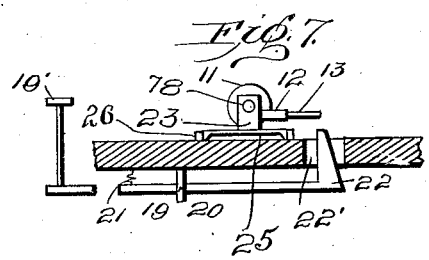

No. 734,526. PATENTED JULY 28, 1903.
G. H. ENNIS.
ELECTRIC TYPE WRITER.
APPLICATION FILED SEPT. 16, 1901.
NO MODEL. 7 SHEETS—SHEET 5.

Witnesses:
J. M. Fowler Jr
Watts T. Estabrook

Inventor
George H. Ennis
By Vernon E. Hodge
Atty.

No. 734,526. PATENTED JULY 28, 1903.
G. H. ENNIS.
ELECTRIC TYPE WRITER.
APPLICATION FILED SEPT. 16, 1901.
NO MODEL. 7 SHEETS—SHEET 6.
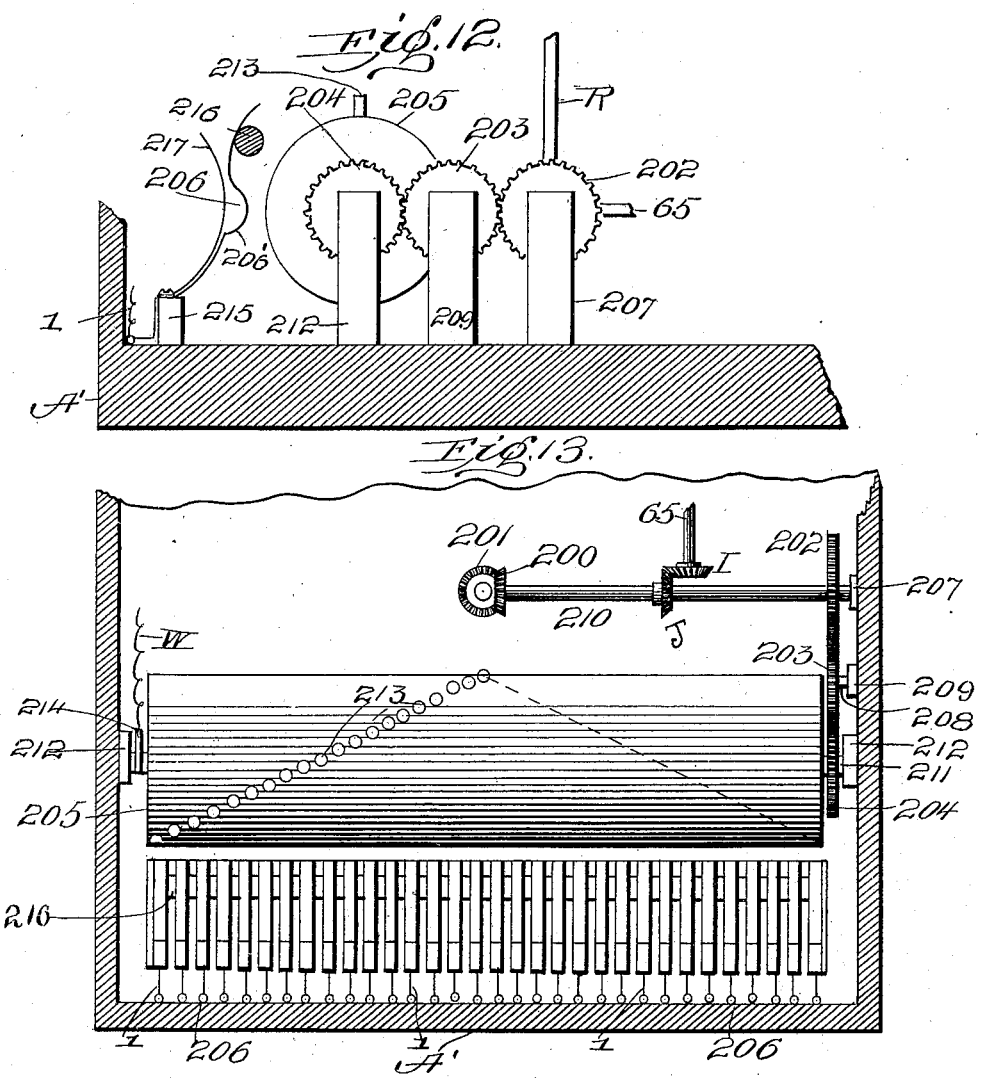

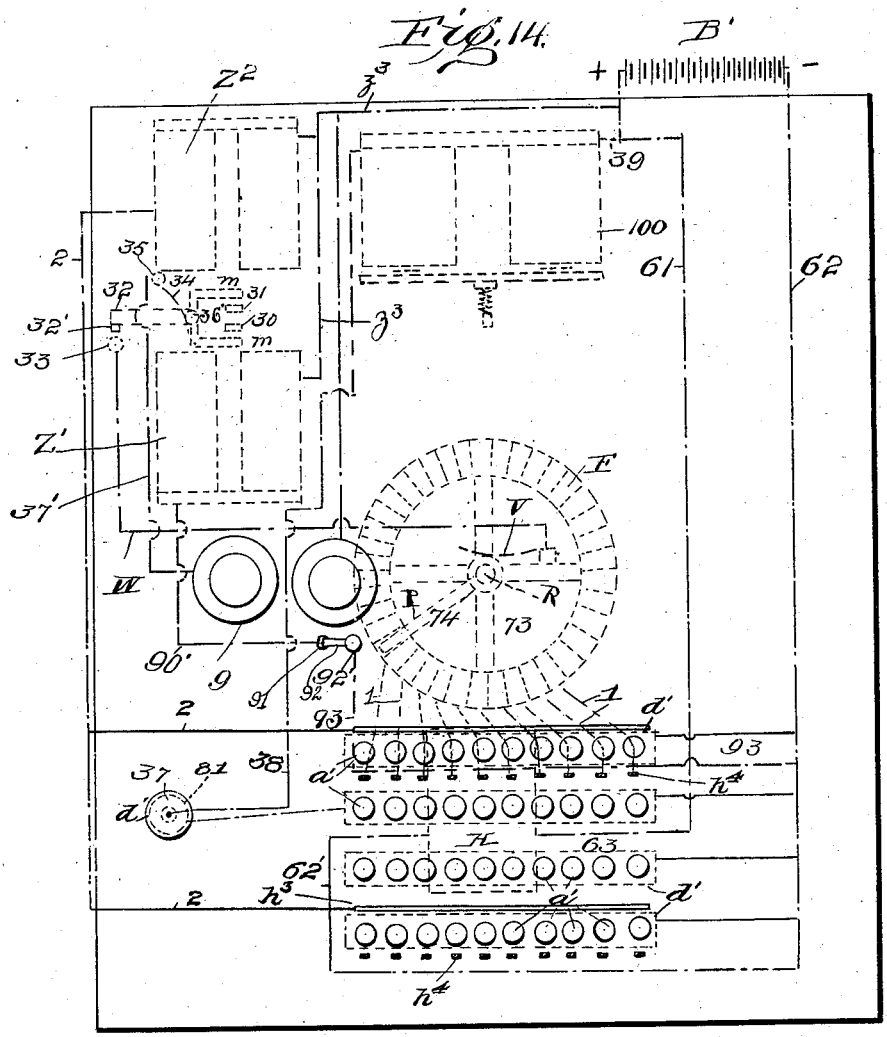

No. 734,526. Patented July 28, 1903.

UNITED STATES PATENT OFFICE.

GEORGE H. ENNIS, OF TROY, NEW YORK.

ELECTRIC TYPE-WRITER.

SPECIFICATION forming part of Letters Patent No. 734,526, dated July 28, 1903.

Application filed September 16, 1901. Serial No. 75,532. (No model.)

*To all whom it may concern:*

Be it known that I, GEORGE H. ENNIS, a citizen of the United States, residing at Troy, in the county of Rensselaer and State of New York, have invented a new and useful Improvement in Electric Type-Writers, of which the following is a specification.

My invention relates to improvements in electric type-writers, the object being to permit a high speed of operation by reducing the labor of making the electric contacts to the least possible motion and pressure of the finger of the operator and to greatly simplify the mechanism used for this purpose.

My invention consists in the construction and combinations hereinafter described, and particularly pointed out in the claims.

In the accompanying drawings like parts are indicated by like characters in the respective drawings.

Figure 9:
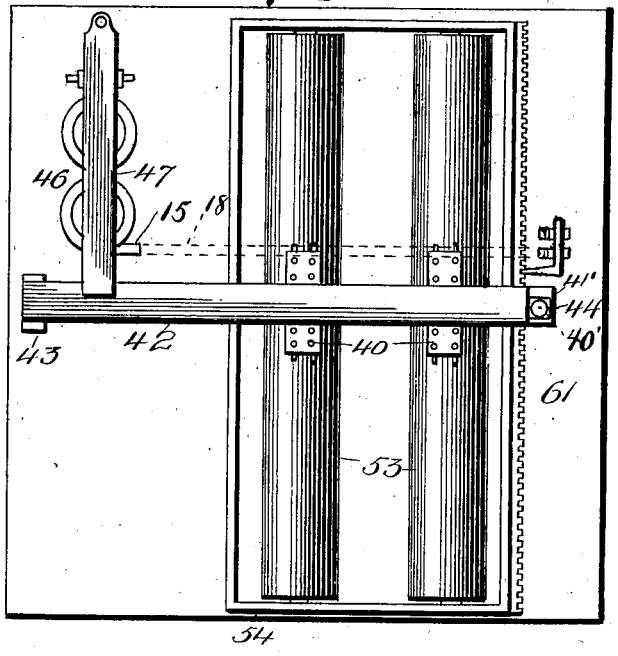
Figure 8:
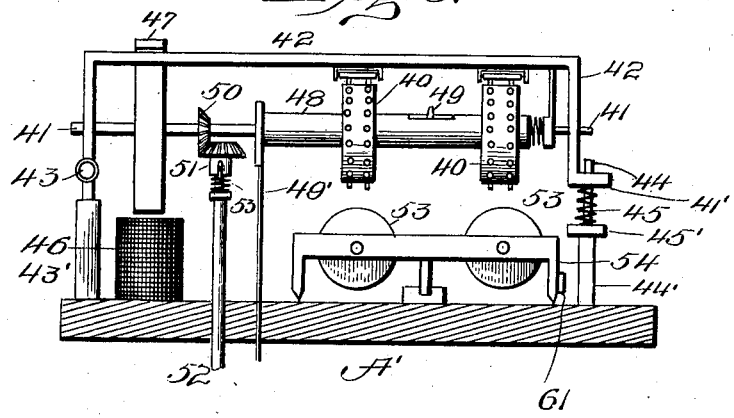

Figure 1 is a plan view of my machine, showing the keyboard or electrical contacts and the arrangement of the printing mechanism. Fig. 2 is a longitudinal section of my machine, showing the wiring of the electrical contacts, the interior arrangement of the working parts, and the printing mechanism on top of machine. Fig. 3 is an interior view showing in detail the circular rotating switch and the motor-magnet with its mechanical connections operating the circular rotating switch and the type-wheel, also the switching magnet and the cut-off magnets. Fig. 4 is a front view of the printing mechanism located on top of the machine. Fig. 5 is a detail view, in side elevation, of the cut-off magnets. Fig. 6 is a detail view showing method of operating the space-rack on the carriage carrying the paper-roll. Fig. 7 is a view showing devices for operating the space-rack by means of the space-bar. Fig. 8 is a view of a modification of my machine, showing two type-wheels mounted on a suitable frame and printing two separate type-inked impressions on the paper of two paper-carriages at the same time. Fig. 9 is a plan view of the mechanism shown in Fig. 8. Fig. 10 is a detail view of a spring contact making and breaking device. Fig. 10$^a$ is a slightly-modified detail view showing another method of making contacts and completing the circuits. Fig. 11 is a view of the button or key adapted to be depressed by the operator. Figs. 12 and 13 are modifications, and Fig. 14 is a diagram showing the circuits.

Referring to Figs. 1 and 2, $a'$ $a'$ are depressible keys or electrical contacts arranged in rows on the top of the keyboard portion of the machine and including as many contacts as there are letters or characters in one row on the type-wheel G, and these characters are arranged in the same order and correspond to certain letters and characters on the type-wheel G. These contacts may bear upon their exposed faces the letters or characters of the alphabet, numerals, &c., as in ordinary type-writer keyboards, the contacts or studs bearing such insignia corresponding to a similar character on the type-wheel G. Each of these contacts is provided with an insulated head. The stem $b'$ of the key is provided with a laterally-extending arm $e'$, having depending contacts $f'$ $f''$ located thereon of unequal length. These contacts are adapted to engage connections $h^3$ $h^4$, respectively, the connection $h^3$ having a wire 2 extending therefrom to the magnet $Z^2$, and the independent contact connections $h^4$ are each provided with separate insulated wires 11, leading therefrom to each of the insulated segmental sections D D of the sunflower F.

F, Figs. 2 and 3, is a circular frame suitably supported and having its upper surface divided into sections D D of equal size and insulated from each other. These insulated sections subdivide the upper surface of the circular frame into equal portions, which portions or segments are equal in number to the electrical contacts on the keyboard and the letters or characters in each row on the type-wheel G.

H is an electric motor of any suitable form deriving its power from a suitable battery B' or other source of electricity. This battery is provided with two main wires 61 62, leading, respectively, from the positive and negative poles thereof into the machine. The wire 62 is connected with each one of a series of metallic plates $d'$, extending just beneath the keyboard and in contact with the stems $b'$ of the keys, and the wire 61 is connected to the wire $c^5$, leading to a rheostat C, connected to the motor H by a wire $c^4$. The electric motor communicates its motion by the gear I on its shaft 65 to the gear J, secured on the shaft R. This shaft extends vertically upward through the casing of the machine, its lower end journaled in the recessed bearing-block 66. The gear M is slidably secured to shaft R at its upper end and is retained in mesh with the gear N, secured on the shaft 5 by means of the coiled spring 67, one end of which bears against the gear-wheel M and the other end contacting with the enlargement 68 on shaft R. A pin 69, projecting from shaft R, is received in a slot 70 on the sleeve 71 of the gear-wheel M, whereby the wheel may be depressed and slide downward on the shaft against the tension of the spring 67, for a purpose hereinafter set forth. Thus it will be seen that continuous motion is imparted to the type-wheel G, which is secured at one end of shaft 5. On the shaft R, within the casing A' of the machine, is secured the trailer-arm P. This trailer-arm P is rigidly secured to rotating shaft R, which shaft is located centrally of the annular switch-stand F. The switch-stand F, bearing on its upper surface the insulated sections D, is supported above the bottom of casing A' upon vertical arms 72, and the annular switch-stand is strengthened by radial arms 73, uniting at their central point and there forming a journal 74, in which shaft R rotates and by means of which it is guided and steadied. The intermeshing gear-wheels I and J are located within the space beneath the annular switch-frame F, the shaft 65, upon the end of which is secured gear-wheel I, projecting between the vertical arms or supports 72.

To the trailer-arm P is secured a light spring 75, the depending end of which is adapted to lightly touch each segment or section D as the trailer-arm is rotated by shaft R. Supported upon one end of the radial arms 73, but insulated therefrom, is a light spring V, the free end of which bears continually upon the rotating sleeve T of the trailer-arm P, and to the opposite end of this spring V is connected a wire W, which wire leads to contact-stud 33, which stud is adapted to be electrically connected with the printing-magnets 9 9, as will be hereinafter set forth. As the trailer-arm P and type-wheel G are geared together and move in unison with each other, the trailer-arm in its rotation will pass over the sections D D on the circular frame F, corresponding in position to similar letters or characters carried by the type-wheel, which letters or characters will be presented to the paper-roller simultaneously with the passage of the trailer-arm P over the corresponding segment or section D, located on the switch-frame F. The contact studs or keys $a'$ $a'$, which may have the characters or letters which they represent indicated thereon, as in an ordinary type-writer, are connected by means of the separate wires 1 1 to the separate segments or sections D D, which are insulated from one another, and as the spring 75 on the trailer-arm, which makes about five hundred revolutions per minute, brushes over the segment which corresponds and is connected to the contact-stud $a'$ touched by the operator a circuit is completed in a manner hereinafter described simultaneously with the presentation of the desired letter or character on the type-wheel to the paper-carrier, and the circuit established actuates mechanism to cause the type-wheel to be depressed, whereby to impress the desired letter or character upon the paper carried by the paper-carrier 11.

The numeral 3, Figs. 1, 2, and 4, indicates an upright frame secured on the top of the machine, and supported at and pivoted in the upper end of the upright 3 at $g^7$ is the swinging skeleton frame 4, which latter may be termed the "type-wheel frame," since the type-wheel shaft 5 is journaled therein at $g$. The swinging skeleton frame 4 is provided with a projecting stud 76, to which is secured a spring 6, the opposite end of which is secured to a pin 77, projecting from the upright 3, which spring normally retains the swinging skeleton frame 4, the shaft 5, and the type-wheel G, with its connected parts, in an approximately horizontal position, the projecting characters or symbols on the type-wheel being held just out of contact with the paper on paper-carrier 11. The purpose of this journaled or pivoted skeleton frame 4 is to permit the entire structure to be depressed by electrically-actuated mechanisms, whereby to cause the impress of the desired character or letter upon the paper. The swinging frame and its connected parts are depressed against the tension of the spring 6, which latter returns the skeleton frame and type-wheel to their normal positions when the electrical force has acted. A supplementary frame 8 on the skeleton frame 4 carries the ink-roller 7 journaled therein above and in contact with the type of the type-wheel G.

The numeral 9 designates an electomagnet which when energized draws down by magnetic attraction the armature-frame 10, pivoted at $h$ to an upright post $h^5$, the lower end of which post is secured on the top of the casing A', and this armature is normally held out of contact with the magnet 9 9 by means of the spring $h'$, secured to its outer end and to the top of the casing, respectively. The opposite or free end of the armature-frame 10 rests upon the swinging skeleton frame 4, and the attraction exercised by the magnet 9 upon the armature 10 operates to force down the swinging frame 4 against the action of spring 6, together with the type-wheel shaft 5 and type-wheel G, supported in frame 4, to cause the impress of the inked type-letter on the paper of paper roller or platen 11. The latter is of any suitable form of construction and is supported upon the shaft 78, journaled in bearings in the moving frame 79. These bearings are formed in uprights 23, and the shaft is provided with the usual knurled turning-knob 24 at one end. The uprights are supported upon a sliding platform 25, which operates between the parallel guide-bars 26 26. Projecting laterally from the uprights 23 is a space-rack 12, which is moved, together with the sliding frame or platform 25, by the spacing mechanism of any suitable kind to be operated by means of the levers 16 and 19.

Numeral 15, Figs. 1 and 6, is a leg attached to and depending from one side of armature-frame 10. This leg passes through an opening $k$ in the top of the casing and rests on the supplementary lever 16, Fig. 6, fulcrumed at 17. When the armature-frame 10 is drawn down by the action of electromagnet 9, the leg 15 will depress the lever 16 against the tension of spring $l$, secured thereto and to the casing, respectively, and force the tapering cam jaw or tooth 18 through an aperture 18' in the casing and in contact with the spacing mechanism, whereby to cause it to advance the rack the space of one tooth. Upon the cessation of the electric current in magnet 9 9 the lever 16 will be withdrawn by its spring $l$ to its normal position.

The numeral 19 in Fig. 7 indicates the space-bar lever, which is fulcrumed at 20. One end of this lever projects out through the top of the casing A' in front and is provided with a bar or plate 19', adapted to be struck by the operator when desirable. The opposite end of the lever is provided with a tapering cam-shaped tooth 22, similar to that located on lever 16, which tooth projects through a slot 22' in the top of the casing, whereby to engage the spacing mechanism in the same manner as does cam-tooth 18. The lever is controlled by the retractile spring 21 and by the action of the cam-jaw 22 will cause the spacing mechanism to move the paper-carriage frame with the paper roller or platen, as explained above in connection with lever 16. It will of course be seen at once that the two spacing-levers 16 and 19 might be combined to form one lever; but I have shown two levers in order to clearly illustrate the feature.

The type-wheel is shifted on its shaft 5 by means of the arm 102 of the armature-lever 101, the latter being controlled by magnet 100. This armature-lever is pivoted to the bottom of the casing at 27 and is provided with an armature proper, 28, secured thereto and located opposite the poles of the electro-magnet 100. A post 29 supports a spring $s$ at its upper end, the opposite end of the spring connected to the armature-lever 101. This spring is adapted to normally retain the armature proper, 28, away from the magnet 100. The upper end 102 of the lever 101 is forked, and the forked ends extend on either side of the arbor or hub 36, to which the type-wheel G is securely fastened. This arbor or hub 36 is slidably held upon the type-wheel shaft 5, one end of which is journaled at $g$ in the depending side 8' of the frame 8, and between this depending side and the hub 36 is a spring $r$, one end of which bears against side 8' of the frame and the opposite end of which contacts with the hub or arbor 36 of the type-wheel. This type-wheel is provided with two rows of type; but it is obvious that a larger number of rows might be used, if desirable. For simplicity and in order merely to illustrate my improvement I have shown but two rows, one of which may consist of type for printing small letters and the other for capital letters, or any other arrangement which may be deemed best.

The type-wheel is represented in Fig. 2 as in position to print the first row of the letters. When it is desired to print any letter in the second row, a switch-key 37, having a plate $d'$, connected with the battery, is touched by the operator. The switch-key 37 is adapted to engage a contact 81, connected by means of a wire 38 with the shifting electromagnet 100, and the electro-magnet 100 is in turn connected to the opposite pole of the battery B' by means of a wire 39. When the switch-key, therefore, is touched, the magnet 100 becomes energized, attracting its armature-frame 28 and through arm 101 presses its forked end 102 against the hub of the type-wheel and moves the type-wheel G the requisite distance against the tension of spring $r$ to bring into position the second row of letters on the type-wheel. Upon the deënergization of the magnet 100 and the return of its armature 28 and arm 101, which are withdrawn by the action of spring $s$, the spring $r$, previously compressed, will force back the type-wheel to its first position.

As the type-wheel G and the rotating trailer-arm P both move very swiftly, if the finger of the operator were not instantly withdrawn from the contact $a'$ $a'$ touched the type-wheel would repeat the letter when not desired. To obviate this and print only one letter until the same contact is again touched, I employ the device shown in Figs. 3 and 5, which represents two electromagnets Z' Z², mounted, as usual, and having each a vertical armature 30 31, respectively adapted to vibrate between the jaws $m$ $m$ of the pivotally-movable lever-switch 32. This lever-switch or yoke is pivotally supported at 36' and is provided with a stud at that point against which the free end of a light spring 34 bears, the opposite end of the spring being secured to a stud 35, and from the stud 35 a wire 37' leads to the printing-magnet 9 9. The stem of the lever-switch or yoke may be provided with a contact-stud 32', adapted to bear against contact-pin 33, to which is connected the wire W, leading from the spring V, which bears against trailer-arm P.

It will be remembered that the contact-keys $a'$ $a'$ are adapted to be connected to the electromagnets Z² by means of contacts $h^3$ $h^3$ and wires 2 2, the circuit being completed by the wire $z^3$, which connects with the opposite pole of the battery to that from which the contact-points $h^3$ $h^3$ receive their source. The magnet Z' is connected, by means of wire 90', to stud 91 on the casing A' of the machine. Located just above this stud 91 is the free end of a flexible spring 92, its opposite end being supported on the casing, and to which latter end is connected a wire 93, which connects with the main battery-wire 62. When it is desired to cause the imprint of a letter upon the paper of paper-carriage 11, the operator depresses the desired key $a'$. The longer contact $f'$ is provided with a suitable conducting point or end, but is surrounded with insulating material for the remainder of its length. This contact-point $f'$ engages the conductor $h^3$, connected, by means of wire 2, with the magnet $Z^2$, thereby causing a current of electricity to pass from the battery along wire 62 to the metallic plate $d'$, through the stem $b'$ and contact-point $f'$, to the conductor $h^3$, to the wire 2. This current passes along wire 2 into the electromagnet $Z^2$, which it energizes, and thereby attracts the armature 31 thereto. This attraction causes the armature to bear against the jaw $m$ and rock the yoke or lever 32 until the projection 32' thereon bears against the contact stud or pin 33. As the key continues in its downward motion the conducting-surface of the contact-point $f'$ leaves the conductor $h^3$, and the insulated portion $m'$ comes in contact therewith and interrupts the current of electricity, which thereby causes the cessation of electrical energy in the electromagnet $Z^2$, but leaves the yoke or lever 32 in the position to which it has been moved. At the time the insulated portion $m'$ engages the conductor $h^3$ the opposite shorter contact $f''$ engages the independent conductor $h^4$, connected by wire 1 with its respective segment $d$ of the commutator or sunflower F. An electric impulse will travel along the wire 1, leading from the conductor $h^4$ to the segment or section D, and when the spring or brush 75 on the trailer-arm P touches this section the electric impulse will enter thereinto and travel along the trailer-arm P to the sleeve T, to spring V, to wire W, and thence into contact-stud 33, from whence it travels into projection 32', along the lever 32 into the spring 34, which bears on stud 36', to stud 35, and thence along wire 37' to the printing-magnet 9, which is thereby energized to cause the imprint of the desired letter. Simultaneously therewith the spring 92 is made to contact with stud 91. This permits the magnet $z'$ to become energized, and this in its turn attracts the armature 30, which bears against the other jaw $m$ and moves the yoke 32 and projection 32' away from the contact-stud 32. This will be more fully explained hereinafter.

As it is oftentimes desirable to make two or more type-inked impressions on the paper, as being more legible and permanent than carbon impressions, my invention readily adapts itself to this use, as shown in Figs. 8 and 9, wherein two type-wheels 40 40 are mounted on the same shaft 41 and supported in the frame 42. This frame is fulcrumed at 43 at one end to a suitable support 43' and is supported on the standard 44 and spring 45 at its opposite end. The depending end 42' of the frame is formed with a lip 41' thereon, having a slot 40' therein. Projecting through this slot 40' is a standard 44, which is suitably supported upon an upright 44'. A spring 45 normally retains the type-wheels 40 40 out of contact with the paper upon paper-carriages 53 53, the ends of the spring bearing against the lip 41' and the shoulder 45' on the upright 44'.

The numeral 46 is the printing-electromagnet, whose armature-frame 47 rests on the main frame 42 and is operated in the same way as explained above in connection with the single type-wheel G. Both type-wheels 40 40 are secured on the sleeve 48 and are fastened to the shaft 41 by a pin 49, working in a slot 46', and can be shifted back and forth on shaft 41 by the forked end of the switch-lever 49', analogous to the method explained hereinbefore for the single type-wheel. The shaft 41 is driven by the bevel-gear 50, secured thereon and which receives its motion from the gear 51, which is movable on the shaft 52 and rests on spring 53. The shaft 52 receives its motion from the motor or other power within the machine. Numerals 53 53 represent the paper-rolls mounted on the carriage-frame 54, and 60 is the dog controlling the action of the space-rack 61 and is operated similarly to the method explained for a single type-wheel.

Having explained in a general manner the arrangements of the various parts and devices of my invention, I will now proceed to explain more fully their operation.

The electric motor H is connected, by means of wire $c^4$, with the rheostat C, the rotating arm $c^3$ of which is connected, by means of wire $c^5$, with main battery-wire 62, and the circuit is completed through main battery-wire 61, which connects the motor with the opposite pole of battery B' by means of connecting-wire 63. Thus it will be seen that the motor is continuously operating at all times to revolve the trailer-arm P and its brush 75 over the sections D and simultaneously therewith to rotate the type-wheel G, which type-wheel and trailer-arm are so synchronized that as the type-wheel presents a type above the paper the trailer-arm at that moment touches and passes over the section or segment D which corresponds to the type presented and which segment, if energized, would cause the impress of that particular type upon the paper. In other words, as the brush 75 on the trailer-arm passes over a segment at that moment and simultaneously therewith is the type corresponding to that segment presented above the paper. Motor H, Figs. 2 and 3, imparts continuous motion to the rotating trailer-arm P, as well as to the type-wheel G connected therewith, through shafts R and 5. If the operator depresses any of the electric contacts $a'$ $a'$, the current will pass from the battery B' along wire 62 to the metallic plate $d'$, into the stem $b'$, through contact-point $f'$ to conductor $h^3$, and thence along wire 2 to the magnet $Z^2$, as heretofore explained. When the insulated portion $m'$ engages the conductor $h^3$, the current passes through the shorter depending contact $f''$ into the conductor $h^4$ and along its insulated wire 1 to one of the insulated sections D D. When the trailer-arm P in its rotation passes onto this section D, the current will pass from this section D through the spring or contact brush 75 of the trailer-arm P to the insulated hub T thereof, to the spring V, and by the insulated wire W to the contact 33 and (the arm 32 having closed the circuit on 33, as previously explained) continues through arm 32 to stud 36', through the spring 34, bearing on the stud 36', to stud 35, and thence to the printing-magnet 9 through wire 37'. The printing-magnet 9 will instantly become energized and attact the armature-frame 10, which will operate to depress the frame 4, carrying the type-wheel shaft 5 and type-wheel G, and cause the imprint upon the paper on the paper-carrier 11 of a neat impression of the letter or character corresponding to the electrical contact touched. When the rotating trailer-arm P passes from the section D through which the current is passing from the electrical-contact key $a'$, depressed by the operator, the current passing through the electromagnet 9 will instantly cease and the armature-frame 10 will be returned to its initial position by the action of its spring $h'$ and through the connected mechanism already explained permit the space-rack and the attached carriage to move one space.

Owing to the rapidity of motion of the machine the operator will not be able to remove his finger and break the electric connection quick enough to prevent the repetition of the letter. To obviate this difficulty, I use the following devices: As heretofore set forth, $h^3$ $h^3$ are electric contacts connected by means of wires 2 2 with the electromagnet $Z^2$, and 90, Fig. 4, is a leg attached to and depending from the front side of armature-frame 10. (The front of the upright frame 3 is broken away to show leg 90.) Numeral 91 is a stud on top of casing A', connected by means of wire 90' with electromagnet Z'. Located a short distance therefrom is a supporting-stud 92', to which a flexible spring 92 is connected at one end, its free end extending over the stud 91 and adapted to contact therewith when pressure is brought to bear on the spring. The stud 92' is connected to main battery-wire 62 by means of wire 93. The operator in depressing the desired key $a'$ causes the passage of an electric current from the battery to electromagnet $Z^2$. This will close the circuit between the trailer-arm P and electromagnet 9 by the action of the magnet $Z^2$ on switch 32, as explained, and the further depression of the key will cause a current to pass into and energize printing-magnet 9, as above described.

When the armature-frame 10 is depressed in the act of printing the type-letter, the leg 90 of the armature 10 will bear upon and press the free end of spring 92 into contact with the stud 91, connected by means of wire 90', with electromagnet $z'$. This permits a current of electricity to pass from battery B', along main battery-wire 62 to wire 93, along which it travels to stud 92' into spring 92 to stud 91, and along wire 90' into the electromagnet $z'$, which is energized thereby and attracts its armature 30, which bears against jaw $m$ of the yoke or pivoted lever 32 and causes it to swing on its pivot 36' and move the projecting stud 32 away from stud 33, thus breaking the circuit between the segments D D and the printing-magnet 9 and restoring the switch 32 to its initial position.

Fig. 11 is a detail view of a contact-key in which $a'$ is the top of a depressible button which is touched by the finger of the operator, the top of the button being insulated from the remainder thereof. $b'$ is the stem. $c'$ is the spring which normally retains the button in raised position. $d$ is the main electrical connection from main battery-wire 62, and $e'$ is a laterally-extending arm secured to the stem $b'$ of the button, this arm carrying the contacts $f'f''$, located at opposite ends thereof. The letters $h^3$ $h^4$ are the connections leading, respectively, to the cut-off magnet $Z^2$ and the insulated section D. The letter $m'$ is an insulated portion of contact $f'$. The method of operation is as follows: When the button is depressed, the contact $f'$ being longer than contact-point $f''$ will first close the connection on member $h^3$, and thereby energize the magnet $Z^2$. As the stem $b'$ further descends the contact on $f'$ will be broken and the contact on $f^2$ closed, whereby the electric impulse from connection-disk $d'$ will pass through the stud $b'$ of the button, through arm $e'$ and contact $f'''$ to contact $h^4$, and thence along wire 1 to the section D.

I have also anticipated that I can employ devices shown in Figs. 12 and 13 (the frame F, section D D, and trailer-arm P) to accomplish the same results. In this construction the motor H in its rotation will drive by its gear I the intermeshed gear J, located on shaft 210. This shaft 210 is supported intermediate its length by any suitable bearings, one of its ends received in a bearing 207, its opposite end provided with a bevel gear-wheel 200, which intermeshes with bevel gear-wheel 201, secured on shaft R. The shaft R drives the type-wheel in the same manner as before explained. Secured upon the shaft 210, near its bearing 207, is a gear-wheel 202, which intermeshes with a similar gear-wheel 203, supported upon and at right angles to a stud-shaft 208, which shaft is received and supported in bearings 209. The gear-wheel 203 in turn drives a gear-wheel 204, located on a shaft 211 supported in bearings 212 on either side of the casing A'. This shaft 211 has secured thereto the cylinder 205. Cylinder 205 is provided with a helicoidal or spiral row of pins on its outer circumference, which row of pins 213 extends from one end of the cylinder to the other and are equal in number to the movable contacts $a'\, a'$ on the keyboard of the machine, thereby subdividing the surface of the cylinder into as many divisions as there are contacts on keyboard and letters in one row of type on the typewheel. This cylinder is in electric connection with a block 214, located on shaft 211, the shaft 211 being suitably insulated with relation to its bearings 212, and from the block 214 a wire W leads to the contact-stud 33. Located parallel with the cylinder 205 and but a slight distance from the periphery thereof is a row of flexible springs 206, suitably supported on insulated blocks 215 and formed with concavo-convex projections 206'' therein, against which the pins 213 are adapted to contact. A rest-rod 216 is provided, upon which the upper ends of springs are normally supported, and a guard 217, behind the springs prevents them from being forced too far out of place by the contact of the pins 213 therewith. These springs may be of any suitable construction, however, the present showing being made merely to illustrate the idea. The springs must be equal in number to the electrical contacts $a'\, a'$ and are connected by separate insulated wires 1 1 to each of the latter. It will be seen that when motion is imparted to the cylinder 205 the pins 213 thereon will successively contact with and press against the springs 206. When the pin reaches the spring which is connected with the electrical contact $a'\, a'$ on the keyboard of the machine which has been touched by the operator, the current will pass from the spring 206 to the pin on the cylinder 205, thence to contact 33, and energize the electro-magnet 9, as explained above. It will act similarly to the revolving trailer-arm, as above explained, and perform the same office.

A slight modification of the construction just described is shown in Fig. 10$^a$, in which the cylinder 205 is shown supported in its bearing 212 and provided with the projecting pins 213 and the gear-wheel 204. Located a short distance therefrom is the supporting-block 215, provided with a step 218, to which step is secured a contact-piece 219, connected, by means of wires 1 1, with the contact-keys on the keyboard. A series of uprights 220 is secured to the block 215, and pivotally secured at the upper ends $f$ of the uprights are a series of arms $d$, which extend over the contact-pieces 219. These arms are insulated from the supporting-uprights 220 and are provided with depending legs $h^2$, adapted to contact with the contact-pieces 219, but normally held from contact therewith by means of the springs $e$, secured to the arm $d$ and the supporting-block 215, respectively. A stud $i$, formed on the end of the arm $d$ which extends over the periphery of the cylinder 205, is adapted to be struck by pin 213 when the cylinder 205 rotates, whereby to force the depending leg $h^2$ into contact with the contact-piece 219, thus providing a bridge whereby the impulse from wire 1 which was energized by the touch of the operator upon the desired contact-stud $a'$ travels through the leg $h^2$, arm $d$, and stud $i$ to the pin 213 and cylinder 205, from whence it connects with contact-stud 33 through wire W, as above set forth, or the cylinder 205 may be cut out electrically and the wire W connected directly with each pivoted arm $d$ by means of branch wires W', as shown in Fig. 10, whereby the impulse is transmitted directly to the stud 33 at the moment the pin 213 on the cylinder 205 strikes the stud $i$, now insulated therefrom, which causes the arm $d$ to rock on its pivot $f$ to force leg $h^2$ against contact-piece 219 which corresponds to section D.

It will be understood that the pins on the cylinder are so arranged, the rotation of the type-wheel and cylinder being synchronous, that as a certain type or letter is presented above the printing-point of the paper-carriage at that same moment and simultaneously therewith does a pin 213 operate the spring 206 or the arm $d$, as may be, which corresponds with the letter presented to the paper and the contact pressed by the operator.

It is evident that many changes and alterations other than those above described might be made in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In a type-writing machine, the combination with a type-carrier, a movable member and means for imparting continuous motion to the type-carrier and member in unison, of a printing-circuit, a switch-lever located in the circuit, independent electrical means for actuating the switch-lever in one direction whereby to complete the printing-circuit and a second electrical means for causing the selection and imprinting of a predetermined character on the type-carrier without interfering with its rotation.

2. In an electric type-writer, the combination of a continuously-moving type-carrier and a movable member operating synchronously therewith, with means for actuating the type-carrier and member, a printing-circuit, an independent circuit, a switch in the printing-circuit, the switch adapted to be actuated in one direction by the independent circuit whereby to close the printing-circuit, means in the printing-circuit for selecting and imprinting a predetermined character on the type-carrier without interfering with the continuous motion thereof, and a secondary circuit actuated simultaneously with the operation of the printing mechanism whereby to cause the lever to break the printing-circuit.

3. An electric type-writer comprising a type-carrier, a movable member, means for continuously actuating the type-carrier and member in unison, means for controlling the speed of the members, a printing-circuit, a make-and-break device located in the printing-circuit, an independent circuit adapted to actuate the make-and-break device to close the printing-circuit, electrical means connected with the movable member whereby to select and cause the imprinting of a predetermined character on the type-carrier without cessation of its motion and a secondary circuit closed by the operation of the printing mechanism whereby to cause the make-and-break device to break the printing-magnet circuit.

4. In a type-writing machine, the combination with a type-carrier, a switch, and a motor for imparting a continuous motion to said parts, of means for causing the selection and imprinting of a predetermined character on the type-carrier, and means for shifting the carrier axially without interfering with its continuous normal movement.

5. An electric type-writing machine comprising a type-carrier, a movable member, means for imparting continuous movement to the type-carrier and member, an electric printing-circuit connected with the movable member, a make-and-break device located in the printing-circuit, an independent circuit which, when energized causes the make-and-break device to complete the printing-circuit, means under the operator's control for energizing the printing-circuit whereby to cause the selection of a predetermined character on the type-carrier, the printing-circuit simultaneously operating to swing the carrier to cause the imprint of the selected character upon the surface to be printed and a secondary electrical circuit adapted to be closed synchronously with the imprint of the desired character, whereby the make-and-break device is caused to break the continuity of the printing-circuit.

6. An electric type-writing machine comprising a type-carrier, a movable member, means for continuously and synchronously actuating the type-carrier and member, an electric printing-circuit, a make-and-break device located in the printing-circuit, a series of sections adapted to be energized one at a time, by an electrical impulse in the printing-circuit, each of the sections in turn adapted to be brushed by the moving member, an independent circuit adapted to cause the make-and-break device to complete the printing-circuit, means for energizing the printing-circuit, the electrical impulse operating to shift the type-carrier laterally whereby to cause the impression of a predetermined character on the type-carrier upon the printing-surface, and a secondary circuit energized simultaneously with the imprint of the desired character whereby to cause the make-and-break device to break the printing-circuit.

7. In a type-writing machine, the combination with a type-carrier, and a motor for imparting a continuous movement to the type-carrier, of a switch which also is actuated continuously, contact-sections, and means for energizing said contact-sections whereby when the sections are engaged by the switch a lateral shift is simultaneously imparted to the type-carrier.

8. An electric type-writing machine comprising a type-carrier, a rotatable shaft upon which the type-carrier is supported, a trailer-arm, a shaft upon which the trailer-arm is supported, gearing connecting the shafts whereby the type-carrier and trailer-arm may be rotated in unison, means for continuously rotating the trailer-arm shaft, a series of sections adapted to be traversed by the trailer-arm, a printing-circuit, each of the sections capable of being included one at a time in the printing-circuit, a make-and-break device located in the circuit, an independent circuit adapted to actuate the make-and-break device to close the printing-circuit, means for transmitting an electric impulse over the printing-circuit whereby to cause the selection and impression of a predetermined character on the type-carrier and a secondary circuit closed simultaneously with the impression of the selected character, whereby the make-and-break device is caused to break the printing-circuit.

9. An electric type-writing machine comprising a keyboard, keys thereon, the keys in electric connection with a printing-circuit, an automatic make-and-break device located in the printing-circuit, an independent circuit adapted to be energized by any key on the keyboard, the independent circuit operating to actuate the make-and-break device to close the printing-circuit, a series of sections adapted to be included in the printing-circuit, one at a time, a member actuated to traverse the sections, a type-carrier, means for operating the type-carrier and member in unison, a printing-magnet located in the printing-circuit, the printing-magnet operating to cause the impression of the desired character in the type-carrier and a secondary circuit closed by the operation of the printing-magnet whereby to move the make-and-break device to break the printing-circuit after each impression.

10. An electric type-writing machine comprising a rotary motor, a shaft rotated thereby, a vertical shaft, gearing connecting the motor-shaft and vertical shaft whereby the vertical shaft is continuously rotated, a horizontal type-carrier shaft intergeared with the vertical shaft, a type-carrier mounted thereon, the type-carrier rotating in unison with the vertical shaft, a trailer-arm secured to the vertical shaft, a series of insulated segments adapted to be brushed by the trailer-arm, a plurality of keys each in electrical connection with a single segment, a make-and-break device, an independent circuit for actuating the make-and-break device, printing mechanism, means whereby an electrical impulse may be transmitted through the keys, and segments to operate the printing mechanism when the make-and-break device has been actuated in one direction, and electrical means operated by the printing mechanism whereby the make-and-break device is moved in the opposite direction to prevent the repetition of the selected letter imprinted.

11. In a type-writing machine, the combination with a pivoted type-carrier frame, a movable type-carrier and a paper-carrier, of an electromagnet, an armature operated and controlled thereby, and means operated by said armature to cause the successive imprint of a character on the type-carrier and the spacing of the paper-carrier.

12. In a type-writing machine, the combination with a paper-roll carriage having a rack thereon, and suitable spacing mechanism adapted to engage the rack, of an electromagnet, an armature having legs depending therefrom, and levers operated by these legs, said levers having teeth thereon for operating the spacing mechanism.

13. In a type-writing machine, the combination with a movable type-carrier and a trailer, and means for actuating them simultaneously and in unison, of suitable contacts for causing the imprint of the desired character on the carrier and a switch operating to prevent the repetition of a letter.

14. An electric type-writing machine comprising a keyboard, keys thereon, a type-carrier, a trailer-arm, means for continuously actuating the type-carrier and trailer-arm in unison, a series of segments, each of which is touched by the trailer-arm simultaneously with the presentation of a predetermined character on the type-carrier to the printing-surface, the keys on the keyboard adapted to be connected each with a single segment, a printing-magnet, the segments adapted to be intermittently in electrical connection with the printing-magnet, electrical means for transmitting an electrical impulse to the segments whereby to cause the imprint of a selected character on the printing-surface and means actuated by the same impulse whereby to cause the printing-surface to move forward a space.

15. An electric type-writing machine comprising a keyboard, keys thereon, a movable type-wheel, a paper-carriage, a movable member operating synchronously with the type-wheel, a series of segments in electrical connection with the keys, a printing-magnet, an armature therefor, an electrical connection leading from the movable member to the printing-magnet, a make-and-break device located in the last-named connection, an independent circuit adapted to move the make-and-break device whereby to close the printing-magnet circuit, a source of electricity, the contact-key connected therewith, the key adapted to complete a circuit whereby an electrical impulse is transmitted to the printing-magnet when the make-and-break device has been moved by the independent circuit to close the printing-magnet circuit, and means operated by the armature of the printing-magnet whereby to automatically move the paper-carriage one step immediately succeeding the imprint of the desired character.

16. An electric type-writing machine comprising a type-wheel, a movable member, means for actuating the type-wheel and member in unison, a keyboard, a series of keys thereon, a series of segments, means for connecting the movable member successively with the segments, the keys connected to the segments, a paper-carriage, the type-wheel presenting a predetermined character to the paper-carriage simultaneously with the engagement of the means connected to the movable member and the segment corresponding to the type presented, a source of electrical energy, the keys adapted to transmit an electrical impulse from the source of electric energy to the segments, and from the segments to the movable member, printing mechanism and means for transmitting the electrical impulse from the movable member to the printing mechanism whereby to cause the impression of the selected type on the type-carrier upon the paper, the printing mechanism simultaneously operating means whereby the paper is moved one space immediately succeeding the printing movement of the type-wheel.

17. An electric type-writing machine comprising type-carrier having a plurality of rows of type thereon, a revoluble shaft upon which the type-carrier is slidably mounted, an arm adapted to shift the type-carrier longitudinally on the shaft, electrical shifting means governing the movement of the arm, a shift-key, connection between the key the electrical means and a source of electricity whereby an impulse may be transmitted to the electrical shifting means from the electrical source to shift the type-carrier in one direction.

18. An electric type-writing machine comprising a continuously-moving type-carrier, a shaft upon which the type-carrier is slidingly mounted, an armature adapted to contact with the type-carrier to force it in one direction, a magnet adapted to attract the armature whereby to shift the type-carrier, means for transmitting at will an electrical impulse to the magnet and automatic means for returning the type-carrier to its initial position upon the cessation of the electrical impulse.

19. An electric type-writing machine comprising a continuously-rotating type-carrier, a paper-carriage, the type-carrier adapted to be shifted axially and swung in the arc of a circle, the paper-carriage provided with a rack, suitable spacing mechanism engaging the rack, printing mechanism for causing the type-wheel to swing in the arc of a circle whereby to cause the impress of the desired character upon the paper carried by the paper-carriage, the printing mechanism operating a lever, the end of the lever adapted to engage the spacing mechanism whereby to cause the advance of the paper-carriage one step immediately succeeding the impress of the desired character upon the paper.

20. An electric type-writing machine comprising a continuously-movable type-carrier, a paper-carriage, printing mechanism for causing the impress of the desired character of the type-carrier upon the paper of the paper-carriage and means operated by the printing mechanism whereby the paper-carriage is advanced immediately succeeding the impression of the selected character upon the paper of the paper-carriage.

21. An electric type-writing machine comprising a continuously-moving type-carrier, a pivoted frame, a shaft upon which the type-carrier is mounted the shaft journaled in the pivoted frame, a printing-magnet, an armature therefor, the armature adapted to swing the pivoted frame, a paper-carriage located within the radius of movement of the type-carrier, a rack on the paper-carriage, spacing mechanism engaging the rack, a pivoted lever, one end of the lever provided with a tapering cam-shaped lug, a leg depending from the armature of the printing-magnet, the leg adapted to contact with the lever whereby the cam-shaped lug engages the spacing mechanism to permit the paper-carriage to advance one step at a time.

22. An electric type-writing machine comprising a type-wheel, a support on which the type-wheel is mounted, the support capable of moving in the arc of a circle, a keyboard, an electromagnet in electrical circuit with the keyboard, an armature for the magnet, the armature adapted to actuate the type-wheel support in one direction, a paper-carriage, a rack carried by the paper-carriage, spacing mechanism adapted to engage the rack, a lever, a tapering cam-shaped tooth formed at one end thereof, and means on the armature whereby the tooth on the lever is forced into contact with the spacing mechanism immediately succeeding the actuation of the type-wheel support by the armature.

23. An electric type-writing machine comprising a keyboard, a plurality of keys thereon, insulated sections to which the keys are electrically connected, a movable member adapted to engage each of the sections in turn, a movable type-carrier, the type-carrier presenting a predetermined character to the printing-surface corresponding to and simultaneously with the engagement of a section by the movable member, a shaft upon which the type-carrier is mounted, a pivoted frame carrying the shaft, a printing-magnet and armature, the armature adapted to swing the pivoted frame whereby to cause the imprint of the selected character upon the surface to be printed, electrical connection between the movable member and the printing-magnet, a make-and-break device located in the printing-magnet circuit, a magnet adapted to cause the actuation of the make-and-break device, the keys on the keyboard in electrical connection with the magnet last named, a main battery, connections from the printing-magnet and make-and-break magnet to the main battery, the opposite pole of the battery adapted to be intermittently connected with the make-and-break magnet by means of the keys on the keyboard whereby to move the make-and-break device to close the printing-magnet circuit, the battery adapted to be connected by means of the keys, with any desired insulated section corresponding to the selected character on the type-wheel whereby to energize the printing-magnet to cause the imprint of the character on the paper-surface, and a secondary circuit adapted to actuate the make-and-break device to interrupt the printing-circuit, the secondary circuit adapted to be closed simultaneously with and by the operation of the printing-magnet, whereby to break the printing-magnet circuit.

24. An electric type-writing machine comprising a printing-circuit, printing devices actuated thereby, a make-and-break device located in the circuit, a source of electricity, magnets connected with the source of electricity and adapted to cause the make-and-break device to move in two directions, means for energizing one of the magnets at will to cause the movement of the make-and-break device in one direction and automatic means for energizing the remaining magnet to cause the actuation of the make-and-break device in the opposite direction.

25. A type-writing machine comprising a plurality of keys, a source of electricity with which the keys are connected, contacts adapted to be engaged by the keys, a series of segments connected to the contacts, a movable member engaging the segments, a type-carrier connected with the movable member, means for normally actuating the movable member and the type-carrier, and electrical means for causing the movement of the type-carrier against the paper when a key engages a contact.

26. An electric type-writing machine comprising a printing-circuit, and a make-and-break device located therein, the make-and-break device consisting of a lever, a stud for limiting the movement of the lever in one direction, a yoke formed at one end of the lever, magnets located on either side of the yoke, the armatures of the magnets embraced by the yoke, an independent circuit connected with one of the magnets, means for energizing the independent circuit at will whereby the magnet thus influenced attracts its armature which moves the lever against the stud to close the printing-circuit, and a secondary circuit connected with the other magnet, the secondary circuit automatically energized by the printing mechanism to cause its magnet to attract the armature and move the lever away from the stud.

27. An electric type-writing machine comprising a printing-circuit, the circuit including a movable member, a printing-magnet, and a make-and-break device located in the printing-circuit, the make-and-break device consisting of a lever, a yoke formed at one end thereof, a stud against which the lever contacts to limit its movement in one direction, the movable member in electrical connection with the stud, a pair of magnets, one on either side the yoke, the armatures of the magnets embraced by the yoke, a contact-piece, the printing-magnet in electrical connection with the contact-piece, a connection extending between the contact-piece and the lever, an independent circuit connected with one of the magnets, means for sending an electrical impulse over the independent circuit to energize the magnet to which it is connected whereby to attract its armature and thus rock the lever into contact with the stud, means for transmitting at will an electrical impulse through the printing-circuit whereby to cause the imprint of the desired character, and electrical means connected with the other of said make-and-break magnets, the last-named means automatically operated to transmit an electrical impulse to the magnet whereby the armature thereof is attracted thereto and rocks the lever away from the contact-stud.

28. An electric type-writing machine comprising a type-carrier, a shaft upon which the type-carrier is slidably mounted, an armature in contact with the type-carrier, the armature pivoted at its lower end, a shift-magnet, a shift-circuit connected to the magnet, means for transmitting an electrical impulse through the shift-circuit to energize the shift-magnet whereby the armature is attracted to shift the type-carrier axially on its shaft and automatic means placed under tension by the attraction of the armature and the movement of the type-carrier, the means adapted to reassert its force to return the armature and type-carrier to their normal position upon the cessation of the electric impulse.

29. An electric type-writing machine comprising a type-wheel, a support on which the type-wheel is mounted, the support capable of moving in the arc of a circle, a keyboard, an electromagnet in electrical circuit with the keyboard, an armature for the magnet, the armature adapted to actuate the type-wheel support in one direction, a paper-carriage, a rack carried by the paper-carriage, spacing mechanism adapted to engage the rack, a lever, a tapering cam-shaped tooth formed at one end thereof, means on the armature whereby the tooth on the lever is forced into contact with the spacing mechanism immediately succeeding the actuation of the type-wheel shaft by the armature, and automatic means for withdrawing the pivoted lever-tooth from contact with the spacing mechanism.

30. An electric type-writing machine comprising a printing-circuit, a printing-magnet in the circuit, an armature for the magnet, a type-carrier, a pivoted frame therefor, the armature bearing upon the frame, legs secured to the armature, means for transmitting at will an impulse through the printing-circuit to cause the armature to move the type-carrier and frame which impresses the selected character upon a printing-surface, and a secondary circuit, one of the legs secured to the armature adapted to close the secondary circuit when the armature moves the pivoted frame.

31. An electric type-writing machine comprising a type-carrier, a pivoted frame in which the type-carrier is supported, a paper-carriage, a rack thereon, a spacing mechanism engaging the rack, a lever, a tapering cam-shaped tooth thereon adapted to project into the path of and bear against the spacing mechanism, a printing-circuit, a printing-magnet therein, the armature of the magnet provided with a leg adapted to move the lever whereby the cam-shaped tooth engages the spacing mechanism to release the rack and automatic means for withdrawing the leg to permit the lever and spacing mechanism to resume their normal positions.

32. An electric type-writing machine comprising a printing-circuit, means for transmitting at will an electric impulse through the circuit, a printing-magnet in the circuit, the armature of the magnet provided with a leg, a secondary circuit for breaking the printing-circuit, a stud to which one end of the circuit leads, a resilient member located in juxtaposition to the stud to which the other end of the circuit leads, the leg adapted to force the resilient member against the stud to complete the circuit, when the armature is attracted to its magnet, and means for returning the armature to its normal position upon the cessation of the electric impulse.

33. An electric type-writing machine comprising a printing-circuit, a magnet in the circuit, a type-carrier, a pivoted frame supporting the type-carrier, the armature of the printing-magnet resting against and adapted to actuate the frame, a make-and-break device located in the printing-circuit, independent and secondary circuits adapted to actuate the make-and-break device each in one direction, means for transmitting at will an electric impulse through the independent circuit to actuate the make-and-break device in one direction whereby to close the circuit, means for transmitting at will an electric impulse through the printing-circuit whereby to cause the armature of the printing-magnet to actuate the pivoted type-carrier frame to cause the impress of the desired character, automatic means for closing the secondary circuit whereby the make-and-break device is caused to break the printing-circuit, the closing of the secondary circuit effected by the movement of the printing-magnet armature, and automatic means for returning the pivoted type-carrier frame and type-carrier to its normal position.

34. An electric type-writing machine comprising a type-carrier, a trailer-arm, a series of contact-sections adapted to be brushed by the trailer-arm, a shaft supporting the trailer-arm, a shaft supporting the type-carrier, means for actuating the two shafts in unison, the series of contact-sections mounted on a frame, arms for strengthening the frame, a bearing formed in the arms, the trailer-arm shaft received in the bearing whereby it is retained in position and guided.

35. An electric type-writing machine comprising a type-carrier, a trailer-arm, a shaft supporting the trailer-arm, a second shaft supporting the type-carrier, means for actuating the two shafts synchronously, a series of contact-sections brushed by the trailer-arm, a keyboard, keys thereon, the keys adapted to be in electrical connection with the contact-sections, a sleeve connecting the trailer-arm with the shaft, a flexible connection bearing against the sleeve of the trailer-arm, a printing-magnet, a make-and-break device, and means for electrically connecting a key with its corresponding section to the printing-magnet through the trailer-arm, the sleeve and the make-and-break device whereby to cause the imprint of the selected character on the type-carrier upon the surface to be printed.

36. An electric type-writing machine comprising a keyboard, depressible keys therein, the keys provided with direct battery connections, means for automatically returning the keys after their depression, a printing-circuit, a make-and-break device therein, an independent circuit for causing the make-and-break device to close the printing-circuit, the terminals of the printing and independent circuits located within the range of movement of the keys, a secondary circuit automatically closed for causing the make-and-break device to break the printing-circuit, a long stud upon the key, the stud consisting of a conducting and a non-conducting material, a short conducting-stud on the key, the depression of the key adapted first to bring the conducting portion of the long stud into contact with the terminal of the independent circuit, thus causing the make-and-break device to close the printing-circuit, and then simultaneously with the contact of the short stud with the terminal of the printing-circuit, to cause the non-conducting portion of the long stud to contact with the terminal of the independent circuit, thus breaking the independent circuit and closing the printing-circuit.

37. In an electric type-writing machine, the combination of a continuously-movable type-carrier, with means for actuating it, a printing-circuit, means for selecting and imprinting a predetermined character on said carrier without stopping the motion thereof, and automatic means operated by the imprinting of the predetermined character whereby to break the printing-circuit, for preventing a repetition of the imprint of the same character.

38. In an electric type-writing machine, the combination with a type-carrier, a switch, and a motor for imparting a continuous motion to the type-carrier, of a printing-circuit independent of the motor-circuit, for giving a lateral shift to the carrier.

39. In an electric type-writing machine, the combination with a movable type-carrier, a movable switch, and means for impelling the two in unison, of contact-sections, and a printing-circuit for establishing at will an electric current through a contact-section corresponding with a given character which section when swept by the switch will cause the imprinting of a corresponding character upon the surface to be printed, and a secondary circuit independent of the printing-circuit, the secondary circuit closed simultaneously with the imprinting of the desired character whereby to break the printing-circuit to prevent the repetition of the character.

40. In a type-writing machine, the combination with a type-carrier, and means for imparting a continuous motion thereto, of contact-keys, contact-sections electrically connected therewith, a switch, a make-and-break device, an independent circuit controlling the make-and-break device, a printing-circuit, and movable devices for establishing at will an electric current through said parts to cause the printing of the selected character.

41. In a type-writing machine, the combination with a movable type-carrier, and means for actuating said carrier, of a keyboard of contacts, a make-and-break device, and means for establishing a current through one of said contacts and the make-and-break device to the carrier to cause the latter to imprint the character corresponding to the one touched on the keyboard.

42. In a type-writing machine, the combination with a type-carrier, and means for shifting it to the desired character, of a keyboard, a plurality of depressible contacts thereon, a source of electricity with which the contacts are connected, a printing-circuit, the contacts adapted to complete a circuit for transmitting a current from the contact touched to the carrier to cause a corresponding character on the latter to be imprinted on the surface to be printed, a make-and-break device and a secondary circuit closed simultaneously with the imprinting of the selected character, the circuit operating the make-and-break device to prevent the repetition of the character.

43. In a type-writing machine, the combination with a type-carrier, of a keyboard having a plurality of contact-keys thereon, a series of insulated sections with which the keyboard-contacts are in electrical connection, a printing-magnet for operating the type-carrier, rotatable means for communicating an electric impulse from the sections to the printing-magnet, the keys when operated adapted to cause a selection of a corresponding character on the carrier.

44. In a type-writing machine, the combination with a source of electricity, of a plurality of keys constantly connected therewith, a plurality of contacts adapted to be engaged by the keys, segments connected with the contacts, a normally moving member engaging the segments successively, a type-carrier connected with the movable member, and electrical means for causing the type-carrier to engage the paper when a key engages a contact.

45. In a type-writing machine, the combination with a rotary laterally-movable type-carrier, a trailer and means for rotating the carrier and trailer continuously and in unison, of a circular series of fixed contact-sections in number corresponding with the characters on the carrier and in position to be successively engaged by the trailer as the corresponding character on the type-carrier is presented to the printing-surface, a keyboard, a plurality of depressible contacts thereon, the contacts adapted to connect with the fixed contact-sections when depressed, a source of electricity with which the contacts are directly connected, whereby, when a contact is depressed an electric impulse is transmitted from the keyboard-contacts, and through such fixed contacts and connections as may be selected, to cause the imprinting of a corresponding character on the carrier.

46. An electric type-writer comprising a single series of keys, a single series of sections, each section having electrical connection with a single corresponding key, a single trailer adapted to have contact with each segment successively, a plurality of type-carriers adapted to move synchronously with the trailer, a plurality of paper-carriers against which the type-carriers respectively impinge, the types carried by each type-carrier occupying the same relative positions on their respective type-carriers, a printing-magnet for actuating the type-carriers to simultaneously impinge against their respective paper-carriers, the printing-magnet in electrical connection with the trailer and a source of electrical energy to impart the primary electrical impulse to the mechanism.

47. An electric type-writer comprising a series of contact-keys, a printing-magnet, means for transmitting an electric impulse from a source of electrical energy to the printing-magnet, a plurality of type-carriers, and a plurality of paper-carriers against which the type-carriers are adapted to simultaneously impinge when the printing-magnet has been energized by the electrical impulse.

48. An electric type-writer comprising a series of keys, a printing-magnet, an armature thereon, a plurality of constantly and synchronously moving type-carriers, a plurality of paper-carriers against which the type-carriers are adapted to impinge, and means for transmitting an electrical impulse from any key to the printing-magnet, the printing-magnet adapted to actuate the armature to cause the simultaneous impinging of the desired type on the type-carriers against the surface to be printed whereby a plurality of corresponding original impressions are simultaneously made.

49. An electric type-writer comprising a series of electrical contacts, a series of segments connected therewith, a printing-magnet, a swinging type-carrier controlled by the printing-magnet and means whereby the same electrical impulse which is transmitted from the electrical contacts to the electrical segments is conveyed to the printing-magnet to cause the actuation of the type-carrier.

50. An electric type-writer comprising a series of movable contact-keys, a series of segments adapted to be electrically connected therewith, a trailer-arm adapted to brush the segments successively, a printing-magnet, electrical connections from the trailer-arm to the printing-magnet, a type-carrier moving synchronously with the trailer-arm, the printing-magnet controlling the actuation of the type-carrier, and a source of electrical energy, one pole of which is connected with the printing-magnet and the opposite pole connected with the contact-keys, whereby a single electric impulse is transmitted directly from the contact-keys to the printing-magnet to cause the imprint of the desired type on the surface to be printed.

51. An electric type-writer comprising a rotatable type-wheel, a swinging frame supporting the type-wheel, a printing-magnet for controlling the movement of the swinging frame, a plurality of contact-keys in electrical connection with one pole of a source of electricity, means for electrically connecting the contact-keys with the printing-magnet, the latter being in circuit with the other pole of the source of electricity, and means independent of the printing-circuit for rotating the type-wheel.

52. An electric type-writer comprising a series of contact-keys, a source of electricity with which the keys are in circuit, a series of segments, with which the keys are electrically connected, a printing-magnet in electrical connection with the segments, a type-carrier actuated by the printing-magnet, the operation of any one of the series of contact-keys adapted to cause the energization of the printing-magnet to actuate the type-carrier and means independent of the printing-magnet for continuously actuating the type-carrier.

In testimony whereof I have signed this specification in the presence of two subscribing witnesses.

GEORGE H. ENNIS.

Witnesses:
 EDWIN MORRISON,
 W. H. H. SAUNDERS.